United States Patent [19]

Kleist

[11] 4,043,217

[45] Aug. 23, 1977

[54] BRAKE PEDAL

[75] Inventor: Earl F. Kleist, Milwaukee, Wis.

[73] Assignee: Allis-Chalmers Corporation, Milwaukee, Wis.

[21] Appl. No.: 711,650

[22] Filed: Aug. 4, 1976

[51] Int. Cl.² .............................................. G05G 1/14
[52] U.S. Cl. ...................................... 74/470; 74/512; 74/560; 267/160
[58] Field of Search ................. 74/470, 512, 513, 539, 74/542, 560, 561, 563; 417/903; 267/160; 244/86, 110 A, 110 H, 111, 112; 251/295; 137/354; 188/1 C; 180/77 R

[56] References Cited

U.S. PATENT DOCUMENTS

| | | | |
|---|---|---|---|
| 1,429,108 | 9/1922 | Schaumburger | 74/560 |
| 1,500,305 | 7/1924 | Fekete et al. | 74/560 |
| 1,898,557 | 2/1933 | McCune | 74/560 |
| 2,040,866 | 5/1936 | Miller | 74/470 |
| 2,133,393 | 10/1938 | Miller | 74/563 |
| 2,779,209 | 1/1957 | Estes et al. | 74/512 |

Primary Examiner—Carlton R. Croyle
Assistant Examiner—Leonard Smith
Attorney, Agent, or Firm—Arthur L. Nelson

[57] ABSTRACT

A brake pedal assembly including a pivotally supported base member carrying an arcuate shank having a radius of curvature equal to the radius of the arm of the pedal. The shank is removably fastened to the base member and a pedal pad is removably fastened to the arcuate portion of the shank for easy assembly of the brake pedal on the tractor.

10 Claims, 12 Drawing Figures

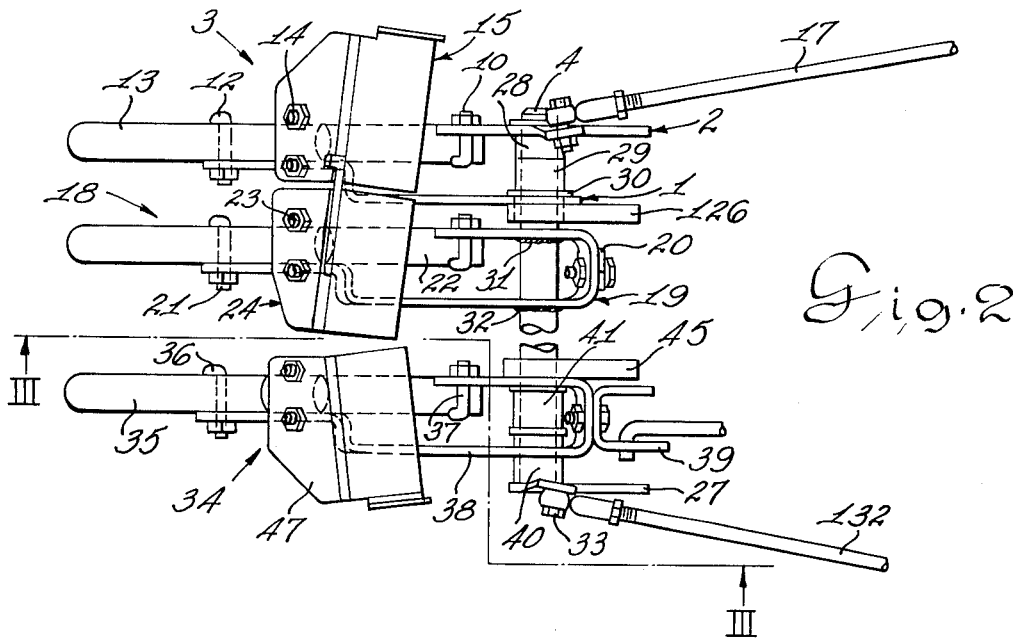
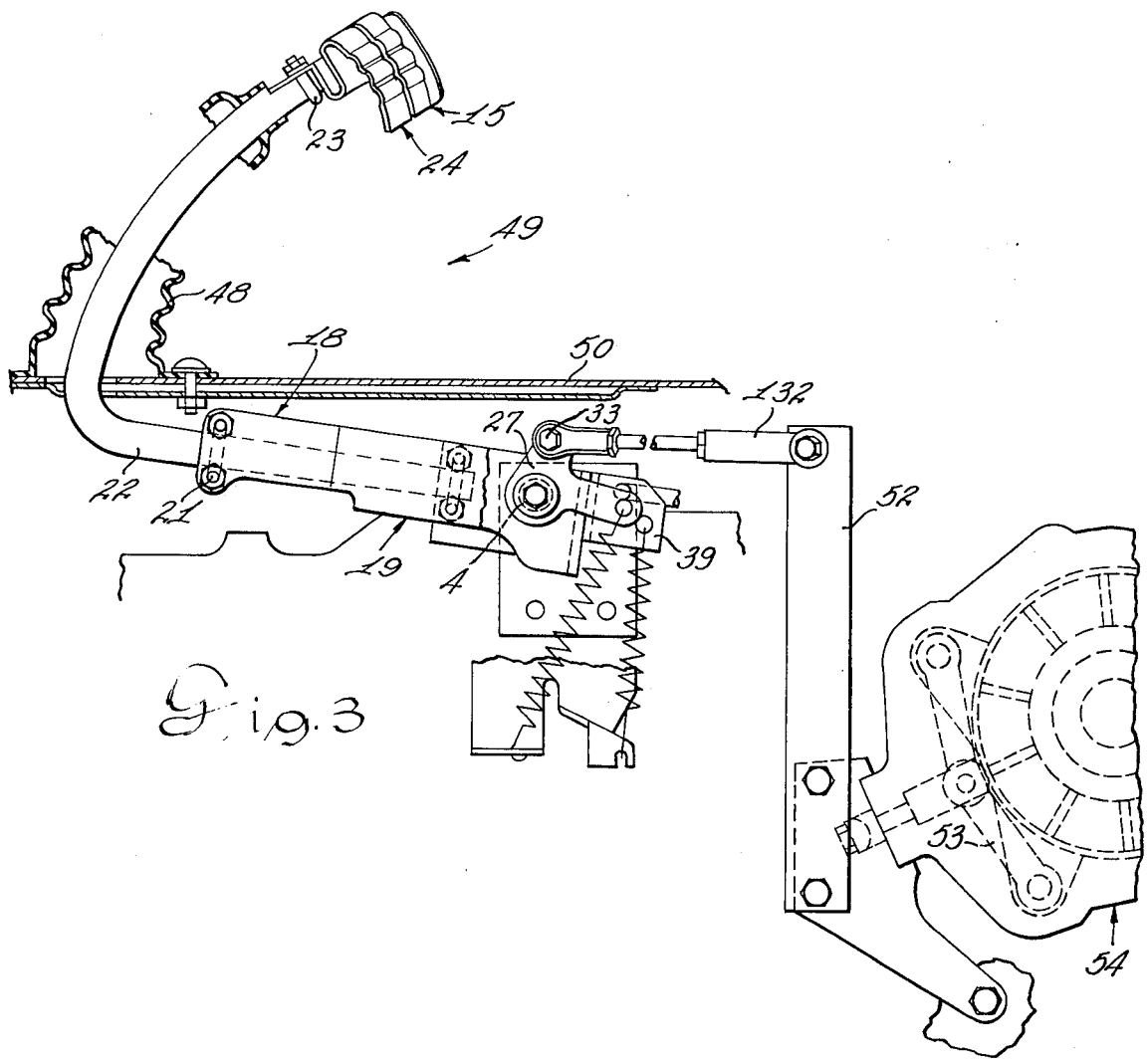

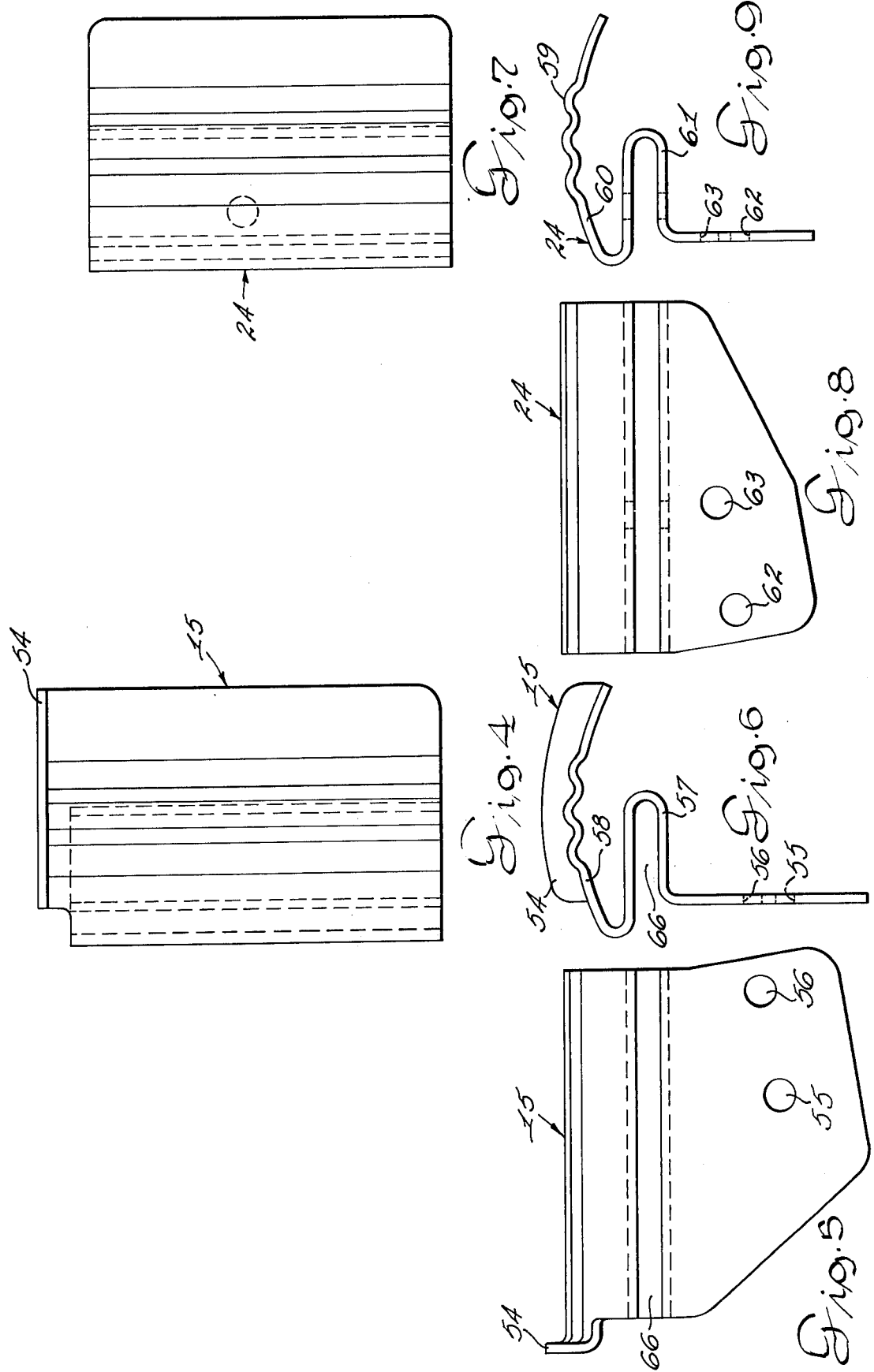

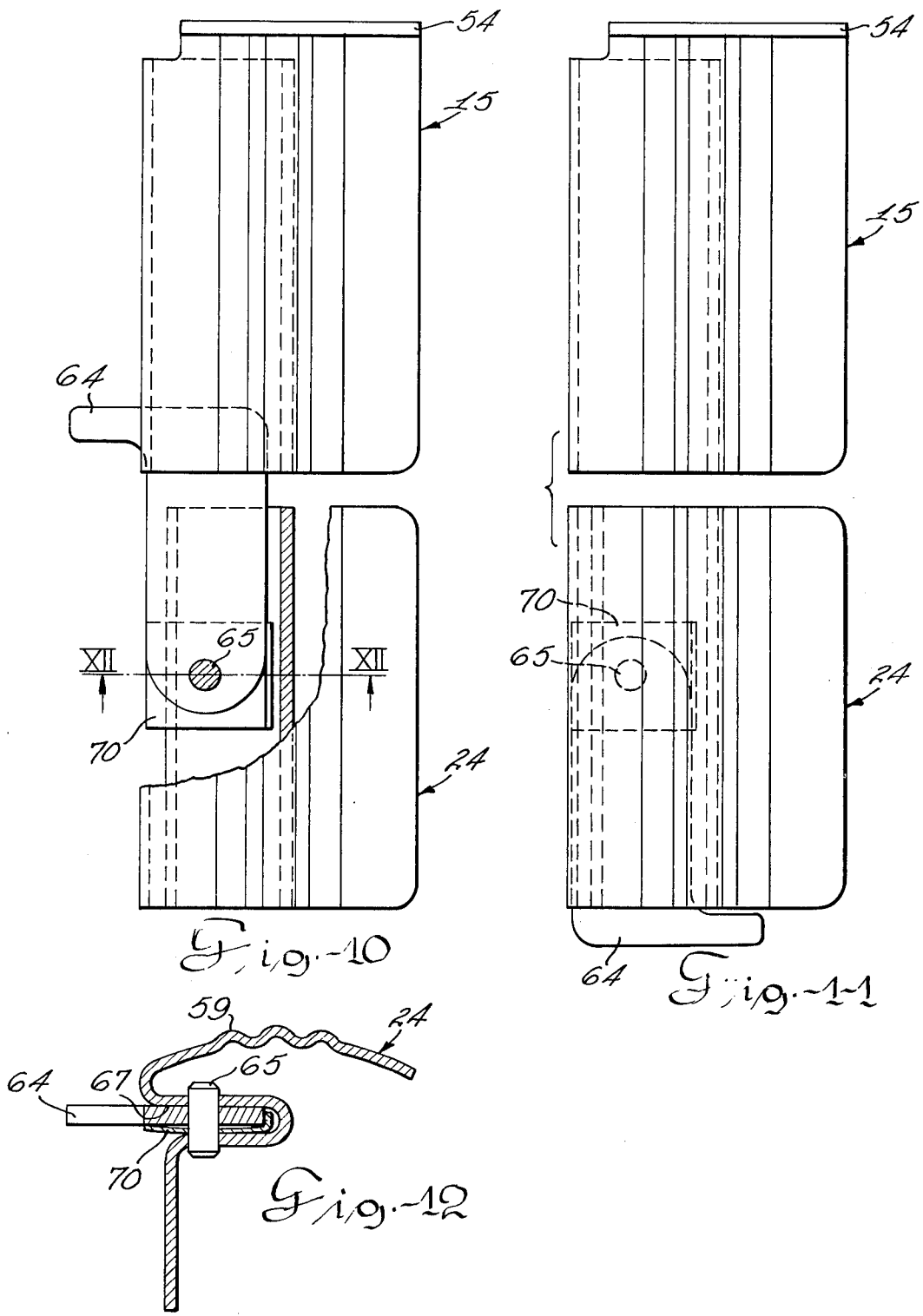

BRAKE PEDAL

This invention relates to a pedal and more particularly to a brake pedal assembly including a base member pivotally mounted on the vehicle chassis with a shank removably connected to the base member. The shank member defines an arcuate segment with a radius of curvature equal to the radial arm of the pedal. The radial arm of the pedal is adjustable so that the arcuate portion of the shank theoretically follows through an opening equal to the cross-sectional area of the arcuate segment of the pedal. The pedal pad is removably connected to the shank and has a double fold to reduce the impact during sudden actuation of the brake pedal to thereby reduce the peak stress in the brake linkage and brakes of the vehicle.

Generally the brake or clutch pedals for a tractor are mounted so as to pivot about a transverse axis located above or below the operator platform or floorboard surface. Where the pedal is mounted on a pivotal axis below the floorboards, a portion of the pedal extends through the floorboards for mounting of the pedal pad to operate the pedal. It is desirable to keep the pedal opening in the tractor platform as small as possible so as to minimize the problem of sealing the opening to prevent entry of noise, dirt and even ambient air when there is a substantial difference between the air temperature in the cab and the ambient air. To accomplish this, this invention provides for a pedal shank which is uniform in cross-section throughout its entire length and it is removably secured to a pivotal base member by means of U-bolts. The portion of the pedal shank that extends through the openings in the platform is arcuately formed. All the linkage is outside of the cab except for the pedal which passes through the opening in the floorboards. This simplifies installation of the pedal and of the boot which may be used as the sealing device to prevent the entry of noise and dirt. The pedal pad is removably secured to the upper end of the pedal shank portion by means of a U-bolt or the like. Removable brake or clutch pads simplify assembly by permitting the boots and foot pads to be assembled on the pedal shank after the cab has been mounted on the tractor. The pedal pad is formed of a sheet metal stamping and is shaped with a depending loop which forms a slot for reception of a rockable locking member to condition the brake pedals for either the selective actuation of the right or left-hand brake or simultaneous actuation of both brakes. A double fold in the foot pad which forms the slot and the foot contacting portion bent back onto itself provides for inherent resilience for yielding to accomplish smooth actuation of the brakes or clutch. This shock absorbing feature is an integral function of the brake pedal.

It is an object of this invention to provide a multiple component brake pedal to facilitate the assembly of the pedal on the vehicle.

It is another object of this invention to provide a pedal pad of sheet metal with double folds to provide resilience for reducing the impact of sudden brake actuation.

It is the further object of this invention to provide a multiple component brake pedal having a pivotally supported base member with a shank removably connected to the base member for removably supporting a brake pad. The shank forms an arcuate section with a radius of curvature equal to the radial arm of the brake pedal.

It is the further object of this invention to provide pedals mounting on a vehicle in which the actuating surface of the pedal is slanted to reduce the chance of slippage between the foot and the pad when the pedal is actuated.

The objects of this invention are accomplished by providing a pivotal axis for the clutch and brake pedals of the vehicle on a horizontal axis beneath the floorboard. Each pedal includes a shank which is connected to the pivotal base member of the pedal and extends through the floorboard for subsequent mounting of the pedal pad. The radial arm of the pedal is adjusted to equal the radius curvature of the pedal when assembled.

The pads include double folds in which one of the folds forms a slot selectively receiving a pivotal latch pivotally mounted on the adjacent brake pedal. This provision of a latch permits single or joint operation of the brake pedals. The brake actuating linkage and the clutch actuating linkages are also positioned beneath the floorboards and adapted for connection to a suitable brake or clutch of the vehicle.

Referring to the drawings:

FIG. 2 illustrates a plan view of the clutch and brake pedals.

FIG. 3 illustrates a section view taken on line III—III of FIG. 2.

FIG. 4 illustrates a plan view of the right brake pedal pad.

FIG. 5 illustrates a front view of the brake pedal pad for the right brake lever.

FIG. 6 illustrates a side elevation view of the right brake pedal pad.

FIG. 7 illustrates a plan view of the left brake pedal pad.

FIG. 8 illustrates a front elevation view of the left brake pedal pad.

FIG. 9 illustrates a side elevation view of the left brake pedal pad.

FIG. 10 illustrates a plan view of the two brake pedal pads with the latch engaged.

FIG. 11 illustrates a plan view of the brake pedal pads with the latch disengaged.

FIG. 12 illustrates a section view taken on line XII—XII of FIG. 10.

Figure 1:
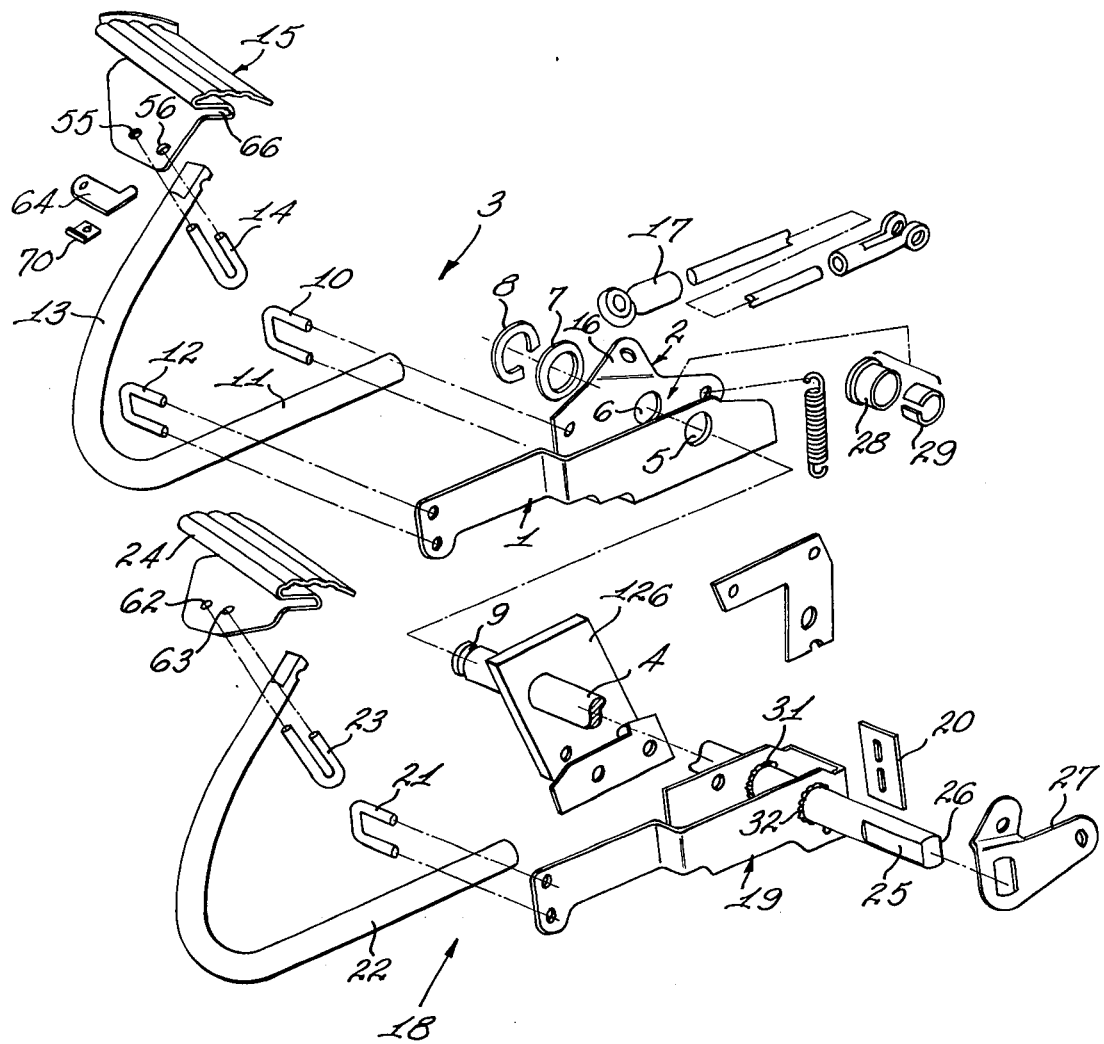
FIG. 1 illustrates an exploded view of the brake pedals.

Referring to FIG. 1, pivotal base members 1 and 2 form the pivotal support of the right brake pedal 3. The base member 1 receives the shaft 4 which extends through the opening 5 in the assembled position. The shaft 4 also extends through the opening 6 of base member 2 and is received within the washer 7 and the snap ring 8 which is received within the groove 9 of shaft 4. The U-bolt 10 connects the shank 11 to the base member 2 while the U-bolt 12 fastens the shank 11 to the base member 1. The shank 11 is adjustable to form a pedal arm of an equivalent length to the radius of curvature of an arcuate segment 13. The U-bolt 14 fastens the pedal pad 15 to the shank 11. The base member 2 forms actuating arm 16 connected to the link 17 of the brake actuating linkage for the right brake.

The left brake pedal 18 includes a base member 19 pivotally welded on the shaft 4. The base member 19 carries the slotted stop plate 20 which is adjustably positioned vertically to engage the vehicle chassis for determining the rest position of the left brake pedal 18.

The U-bolt 21 fastens the shank 22 to the base member 19. The U-bolt 23 fastens the shank 22 to the pedal pad 24. The shaft 4 is formed with flats 25 and 26 on opposing sides on the end of the shaft to receive the actuating arm 27. The actuating arm 27 operates a link 132 similar to link 17 which is connected to the brake actuating mechanism of the left brake pedal. The support 126 is mounted on the vehicle chassis and pivotally supports the shaft 4. The bushings 28, 29 and 30 pivotally support the base members 1 and 2.

Referring to FIG. 2, the plan view of the clutch and brake pedals are shown. The left brake pedal 18 is welded by means of the weldments 31 and 32. The shaft 4 operates the link 132 which is pivotally connected by means of the pin 33 to actuating arm 27 which engages the flats on opposing sides of the shaft as illustrated in FIG. 1.

The clutch pedal 34 includes the shank 35 which is fastened by the U-bolts 36 and 37 to the base member 38. The base member 38 is connected through the actuator link 39 to the clutch actuating mechanism. The clutch pedal 34 is pivotally mounted on the bushings 40, 41 mounted on the shaft 4. The support member 45 also pivotally supports the shaft 4. The clutch pedal carries a pad 47 similar to the brake actuating pads.

The boot 48 is mounted on the floorboard 50 and embraces the shank 22 of the pedal 18 to seal the passenger compartment 49 of the underside of the floorboards 50. The link 132 is connected to the brake actuating arm 52 which is connected to the brake actuating linkage 53 of the brake 54. Similarly, the right-hand brake is connected to the actuating link 17 for braking a right wheel brake of the vehicle not shown.

FIGS. 4, 5 and 6 show the right brake pedal pad 15. The flange 54 formed on the right-hand side of the pad 15 prevents the foot engaging the pedal pad 15 from sliding off the end of the pad. The openings 55 and 56 receive the U-bolt 14 when the pedal is fastened. The pad forms a dependent fold 57 and the tread fold 58 which forms an S-curve in the cross-section shown in FIG. 6. This double fold provides resilience in the pedal and reduces the effect of impact during sudden operation of the brake pedal.

Referring to FIGS. 7, 8, and 9, the left brake pedal pad 24 is shown with a tread surface 59 forming the upper surface of the pad. The tread pad fold 60 and dependent fold 61 form resilience for the brake pedal 18. The pad 24 is formed with the openings 62 and 63 which receive the U-bolt 23 for fastening the pad 24 to the pedal 18.

Referring to FIGS. 10, 11 and 12 the latch 64 is pivotally mounted by means of a pin 65 on pad 24. The latch 64 is pivoted into the slot 66 of the pad 15 to lock the two pedals together for simultaneous operation. The flat spring 70 presses the latch 64 to engagement with the surface 67. The pressure from the spring 70 holds the latch in the engaged position as shown in FIG. 10 or the disengaged position as shown in FIG. 11. When the latch 64 is in the disengaged position as shown in FIG. 11, each pedal is operated individually to operate the respective brake connected to the pedal.

Each of the pedals shown includes a double fold on the pad to provide resilience and actuation of the pedal. Each pad is slanted to theoretically present a tread surface normal to the actuating force from the foot of the operator. The brake pedals are actually spaced substantially to the right from the clutch pedal from that shown in FIG. 2. This accounts for the slant of the tread surface as illustrated.

As each pedal is actuated, the double folds tend to compress which reduces the effect of the impact of the operator suddenly actuating the pedal which in turn reduces the peak stress on the pedal and the actuated linkage connected to the pedal. Each of the pedals is sealed by a boot in the floorboard. Theoretically the pedal moves through a space in which the cross-section of the shank of the lever moves through an area approximately equivalent to the cross-sectional area of the shaft when the pedal is properly adjusted so that the radial arm of the lever is equal to the radius curvature of the arcuate segment of the lever. All of the levers have an arcuate segment and adjustment for the actuating arm of the respective pedal.

The pedals are constructed in such a manner that they can be assembled with the individual components one at a time as it is mounted on the vehicle or a subassembly of the lever can be mounted in position and extending the shank through the opening of the floorboards. Subsequent to extending the shank through the opening in the floorboards, the boot 48 can be positioned on the respective lever and then the pad can be mounted on the end of the lever. This provides a convenient means of assembly of the pedal on the vehicle.

The embodiments of the invention in which an exclusive property or privilege is claimed are defined as follows:

1. A pedal comprising, a base member, mounting means pivotally supporting said base member, a shank member forming an arcuate segment and radial arm for connection with said base member, means adjustably fastening said shank member on said base member to adjustably set the radial length of said radial arm to equal the radius of curvature of said arcuate segment of said shank, a food pad, means fastening said foot pad to the end of said arcuate segment, a mounting flange on said foot pad, a tread portion on said foot pad, a resilient fold in said foot pad between said tread portion and said mounting flange to provide a shock absorbing means for reducing the pedal forces transmitted from said pedal to pedal operated mechanisms.

2. A pedal as set forth in claim 1 wherein said foot pad defines a vertical cross-section forming an S-curve.

3. A pedal as set forth in claim 1 wherein said shank defines a uniform cross-sectional area throughout the length of said shank.

4. A pedal as set forth in claim 1 including a depending fold in said foot pad.

5. A pedal as set forth in claim 1 including a second pedal, each of said pedals defining a groove formed by a depending fold forming a groove, a latch pivotally positioned in the groove of one pedal and pivotal for reception in the groove of the second pedal to operate said pedals simultaneously.

6. A pedal as set forth in claim 1 wherein said support means includes a floorboard, means defining an opening for receiving the shank of said pedal, a boot mounted on said floorboard encircling said opening and extending to embrace said pedal for sealing the opening in said floorboard.

7. A pedal as set forth in claim 1 wherein said means for fastening said foot pad to said pedal includes means defining a recess on the end of said pedal, a U-bolt clamping said foot pad in said recess.

8. A pedal as set forth in claim 1 wherein a sheet metal element forms said foot pad, said foot pad defines a slanted tread surface for engaging an operator's foot normal to the operating force.

9. A pedal as set forth in claim 1 wherein said foot pad defines a sheet metal element, said sheet metal element includes a depending fold and a tread portion fold defining a double fold in said pad to provide resilience between the tread portion and said shank.

10. A pedal as set forth in claim 1 including a second substantially identical pedal, said pedals defining brake pedals, means defining an axis for pivotally supporting both of said pedals, each of said pedals defining a depending fold defining a slot, means pivotally supporting a latch in one of said folds of said pedals, said latch pivotally positioned to a rest position in said one of said folds of one of said pedals and pivot to an operating position in the fold of said second pedal to operate said pedals simultaneously.

* * * * *